United States Patent
Ma et al.

(10) Patent No.: US 11,220,642 B2
(45) Date of Patent: Jan. 11, 2022

(54) PULVERIZED COAL GASIFICATION DEVICE AND PROCESS FOR PRODUCING HIGH HEATING VALUE COAL GAS WITH LOW CARBON RESIDUE CONTENT

(71) Applicant: SHANDONG UNIVERSITY, Shandong (CN)

(72) Inventors: Chunyuan Ma, Jinan (CN); Tao Wang, Jinan (CN); Binxuan Zhou, Jinan (CN); Zhen Zhang, Jinan (CN); Jiapeng Fu, Jinan (CN); Liqiang Zhang, Jinan (CN); Xiqiang Zhao, Jinan (CN); Xingxing Cheng, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 435 days.

(21) Appl. No.: 16/466,810

(22) PCT Filed: Aug. 3, 2018

(86) PCT No.: PCT/CN2018/098663
§ 371 (c)(1),
(2) Date: Jun. 5, 2019

(87) PCT Pub. No.: WO2019/029458
PCT Pub. Date: Feb. 14, 2019

(65) Prior Publication Data
US 2020/0087589 A1 Mar. 19, 2020

(30) Foreign Application Priority Data

Aug. 8, 2017 (CN) .......................... 201710671922.9
Oct. 30, 2017 (CN) .......................... 201711041111.7
Oct. 30, 2017 (CN) .......................... 201721430531.X (51) Int. Cl.
*C10J 3/50* (2006.01)
*C10J 3/52* (2006.01)
*C10J 3/76* (2006.01)

(52) U.S. Cl.
CPC ............... *C10J 3/506* (2013.01); *C10J 3/526* (2013.01); *C10J 3/76* (2013.01); *C10J 2200/152* (2013.01); *C10J 2300/093* (2013.01); *C10J 2300/0956* (2013.01)

(58) Field of Classification Search
CPC combination set(s) only.
See application file for complete search history.

(56) References Cited

U.S. PATENT DOCUMENTS 2,801,158 A * 7/1957 Grossman ................ C10J 3/506
48/78
3,844,733 A * 10/1974 Donath ..................... C10J 3/466
48/202

(Continued)

FOREIGN PATENT DOCUMENTS

CN 1685035 A * 10/2005 ............. C10K 1/026
CN 102212399 A 10/2011

(Continued)

OTHER PUBLICATIONS

Oct. 22, 2018 International Search Report issued in International Patent Application No. PCT/CN2018/098663.

*Primary Examiner* — Kaity V Chandler
(74) *Attorney, Agent, or Firm* — Oliff PLC (57) ABSTRACT

A pulverized coal gasification device and process for producing high heating value coal gas with low carbon residue content includes a U-shaped coal gas generation furnace and a coal gas-semicoke separating device, and the U-shaped coal gas generation furnace consists of two section structures including high-temperature and low-temperature sections which are arranged in a U-shaped manner; the high- (Continued)

temperature section and the low-temperature section share an ash hopper; the high-temperature section is a downward entrained-flow bed, and the low-temperature section is an upward entrained-flow bed; and an inlet of the coal gas separating device is connected to the outlet of the low-temperature section, a solid outlet of the coal gas separating device is connected to an inlet of the high-temperature section, and a gas outlet of the coal gas separating device is connected to a coal gas waste heat utilizing and purifying system. The coal utilization rate can be greatly increased.

8 Claims, 4 Drawing Sheets

(56) References Cited

U.S. PATENT DOCUMENTS

| | | | | |
|---|---|---|---|---|
| 4,721,514 A | * | 1/1988 | Kikuchi | C10J 3/54 48/202 |
| 4,872,886 A | * | 10/1989 | Henley | C10J 3/721 48/197 R |
| 5,580,362 A | * | 12/1996 | Manulescu | B01J 8/1836 48/128 |
| 2004/0031450 A1 | * | 2/2004 | Chandran | B01D 51/08 122/24 |
| 2009/0025292 A1 | * | 1/2009 | Calderon | F02C 3/28 48/89 |
| 2011/0203177 A1 | | 8/2011 | Stroyakovsky et al. | |
| 2014/0318013 A1 | * | 10/2014 | Simmons | C10J 3/00 48/111 |
| 2017/0037328 A1 | * | 2/2017 | Wormser | C10J 3/66 |

FOREIGN PATENT DOCUMENTS

| | | | |
|---|---|---|---|
| CN | 107118807 A | 9/2017 | |
| CN | 107653006 A | 2/2018 | |
| CN | 207313542 U | 5/2018 | |
| DE | 4105280 A1 | 8/1991 | |
| JP | 2009120633 A * | 6/2009 | Y02E 20/18 |
| WO | 2010/053399 A1 | 5/2010 | |

* cited by examiner

PULVERIZED COAL GASIFICATION DEVICE AND PROCESS FOR PRODUCING HIGH HEATING VALUE COAL GAS WITH LOW CARBON RESIDUE CONTENT

BACKGROUND

Technical Field

The present invention belongs to the technical field of the coal chemical industry, and particularly relates to a pulverized coal gasification device and process for producing high heating value coal gas with low carbon residue content.

Related Art

A coal gasification technology is one of ways for cleanly and efficiently utilizing coal, and the technology is mainly used for producing city coal gas, chemical synthetic feed gas, fuel gas for combined cycle power generation, and the like. In recent years, along with increasing of the environmental protection standard for industrial kiln flue gas emission of industries such as building materials, ceramics and glass, original coal kilns are changed into fuel gas kilns, demands for industrial fuel gas are increased, however, China is short of natural gas resources, and thus, the production of the industrial fuel gas through coal gasification has become an inevitable choice. At present, the following two problems exist in the application of coal gas generation furnaces for generating the industrial fuel gas in China:

First, the heating value of produced coal gas is not high, main effective constituents of fuel gas produced by an existing low-pressure or normal-pressure coal gasification technology are CO and $H_2$, the content of hydrocarbons is quite low, the content of $N_2$ is high, and thus, the heating value of fuel gas is low. In CO, $H_2$ and $CH_4$ which are the main effective constituents of the coal gas, the volume heating value of $CH_4$ is the highest, therefore, in order to increase the heating value of the coal gas, the content of $CH_4$ in the coal gas needs to be increased, and the contents of non-effective constituents including $N_2$ and $CO_2$ need to be reduced.

Second, the carbon residue content of fly ash in raw coal gas is high and carbon residues are difficult to use, the existing low-pressure or normal-pressure coal gasification technology is limited by technologies and processes, and the carbon residue content of coal ash collected by coal gas purification is quite high. For example, by a circulating fluidized bed normal-pressure gasification technology, raw material particles are broken in a gasifier to produce a large number of fine particles, the fine particles pass through the gasifier once through, and are difficultly collected and recycled through a cyclone separator. The particle residence time is short, the amount of generated fly ash accounts for 20-25% of feeding coal amount, the carbon residue content in the fly ash reaches up to 45%-50%, but the carbon residues in the fly ash are difficultly conveyed back into a fluidized bed gasifier to be gasified again. Thus, the gasification efficiency is low, and the utilization rate of the raw material is also low. For other low-pressure or normal-pressure gasification processes, the problems that the carbon residue content in the fly ash in the raw coal gas is high, and the carbon residues are difficult to use also exist.

SUMMARY

In order to overcome shortcomings in the prior art, the first purpose of the present invention is to provide a pulverized coal gasification device for producing high heating value coal gas with low carbon residue content, high heating value coal gas or chemical synthetic gas is produced as needed. Meanwhile, gasification carbon residues can be fully utilized, unreacted gasification semicoke (carbon residues) and carbon-residue-containing coal fly ash collected by coal gas purification are conveyed back to a coal gas generation furnace again to be gasified, and the coal utilization rate can be greatly increased.

The pulverized coal gasification device for producing the high heating value coal gas with the low carbon residue content of the present invention includes a U-shaped coal gas generation furnace and a coal gas separating device. The U-shaped coal gas generation furnace consists of two section structures including a high-temperature section and a low-temperature section which are arranged in a U-shaped manner; the high-temperature section and the low-temperature section share an ash hopper; the high-temperature section is a downward entrained-flow bed, and the low-temperature section is an upward entrained-flow bed. And an inlet of the coal gas separating device is connected to with an outlet of the low-temperature section, a solid outlet of the coal gas separating device is connected to with an inlet of the high-temperature section, and a gas outlet of the coal gas separating device is connected to a coal gas waste heat utilizing and purifying system.

The low-temperature section of the present invention can adopt the following two arrangement modes:

The first low-temperature section arrangement mode is as follows:

the low-temperature section includes a low-temperature section furnace body, a position where the low-temperature section furnace body is connected to the high-temperature section is a low-temperature section throat, an oxygen\air nozzle is arranged at a lower end of the low-temperature section throat, and low-temperature section pulverized coal nozzles are arranged at an upper end of the low-temperature section throat.

The second low-temperature section arrangement mode is as follows:

the low-temperature section includes a low-temperature section furnace body, a position where the low-temperature section furnace body is connected to the high-temperature section is a low-temperature section throat, an oxygen\air nozzle is arranged at a lower end of the low-temperature section throat, and low-temperature section pulverized coal nozzles are arranged at the low-temperature section throat.

Further, the low-temperature section furnace body is further provided with a microwave reforming device.

The microwave reforming device is auxiliary equipment, and can be selectively used as needed.

Further, the low-temperature section pulverized coal nozzles are of single-channel structures.

Further, a feeding mode of the low-temperature section pulverized coal nozzles is a pneumatic conveying mode, and a conveying medium is nitrogen or hot smoke; and a number of the low-temperature section pulverized coal nozzles is two, and the two nozzles are arranged oppositely.

Further, a feeding mode of the low-temperature section pulverized coal nozzles is a chute mode.

Further, the high-temperature section includes a high-temperature section furnace body, a water-cooled wall is arranged on an outer side of the high-temperature section furnace body, and a high-temperature section pulverized coal nozzle is arranged on the top of high-temperature section furnace body.

Further, the high-temperature section pulverized coal nozzle is of a three-channel structure, and the three-channel structure includes a central material feeding layer, an outer pure oxygen feeding layer and an outermost water vapor feeding layer.

The second object of the present invention is to provide a pulverized coal gasification process of the pulverized coal gasification device based on production of the high heating value coal gas with the low carbon residue content.

The pulverized coal gasification process of the pulverized coal gasification device based on production of the high heating value coal gas with the low carbon residue content of the present invention includes:

step 1: the raw materials is gasified through pure oxygen in a high-temperature section to generate high-temperature coal gas at a temperature from 1300° C. to 1600° C. where the raw materials include semicoke which is not gasified completely at the low-temperature section, coal fly ash and raw pulverized coal;

step 2: the high-temperature coal gas generated in step 1 enters the low-temperature section, the high-temperature coal gas is tempered via air/oxygen, the high-temperature coal gas is mixed with the raw pulverized coal which is sprayed by the low-temperature section pulverized coal nozzles to move upwards together, and thermal decomposition and partial gasification reaction are carried out on the coal to obtain coal gas with high content of hydrocarbons substances and semicoke which is not gasified completely, where a gasification temperature of low-temperature section is 900° C. to 1100° C.; and step 3: separating the coal gas from the semicoke obtained in step 2, feeding the coal gas into a coal gas waste heat utilizing and purifying system, and collecting and feeding the semicoke into the high-temperature section and gasifying the semicoke at a high temperature; and also feeding coal fly ash which is collected by the coal gas waste heat utilizing and purifying system into the high-temperature section and gasifying the coal fly ash at a high temperature.

Compared with the prior art, the present invention has the beneficial effects that:

(1) according to the pulverized coal gasification device for producing the high heating value coal gas with the low carbon residue content, the high heating value coal gas with relatively high content of the hydrocarbons substances can be obtained through gasification of two sections namely the high-temperature section and the low-temperature section, the raw materials are subjected to gasification reaction in the high-temperature section to obtain the high-temperature coal gas, after the high-temperature coal gas enters the low-temperature section, newly added pulverized coal is subjected to thermal decomposition reaction with the aid of heat of the high-temperature coal gas, homogeneous gasification reaction and heterogeneous gasification reaction are carried out simultaneously, and finally, the high heating value coal gas with high content of the hydrocarbons substances and the unreacted semicoke are obtained; where the unreacted semicoke is directly fed into the high-temperature section and is gasified at the high temperature.

(2) The gasification carbon residues can be fully utilized, the carbon conversion rate is high. The coal fly ash, which is collected by coal gas dust removal purification device, is directly fed into the high-temperature section gasified at the high temperature, the carbon residues are utilized, and thus, the carbon conversion rate is increased.

(3) The microwave reforming device is arranged at the low-temperature section of the present invention, under the microwave effect, the content of tar can be reduced, and coal gas components are adjusted according to the requirement of a user to obtain synthetic gas.

BRIEF DESCRIPTION OF THE DRAWINGS

The accompanying drawings of the specification constitute a part of the present invention and provide a further understanding of the present invention, and the schematic embodiments of the present invention and their descriptions are used to explain the present invention, but are not intended to improperly limit the present invention.

Where 1—pulverized coal; 2—coal fly ash; 3—oxygen; 4—water vapor; 5—gasification nozzle; 6—fed water; 7—low-temperature section; 8—water-cooled wall; 9—water vapor; 10—ash hopper; 11—slag; 12—air/oxygen nozzle; 13—low-temperature section pulverized coal nozzle; 14—high-temperature section; 15—microwave reforming device; 16—coal gas separating device; 17—semicoke; and 18—coal gas.

DETAILED DESCRIPTION

It is to be noted that all the following detailed descriptions are exemplary and are intended to provide further explanation of the present invention. Unless defined otherwise, all technical and scientific terms used herein have the same meaning as commonly understood by one of ordinary skill in the art to which the present invention belongs.

It should be noted that the terminology used herein is for the purpose of describing particular embodiments only but is not intended to be limiting of exemplary embodiments according to the present invention. The expression in the singular form in this specification will cover the expression in the plural form unless otherwise indicated obviously from the context, and moreover, it will be further understood that the terms "comprises", "includes", "comprising" and/or "including", when used in this specification, specify the presence of features, steps, operations, devices, components and/or groups thereof.

Embodiment I

Figure 1:
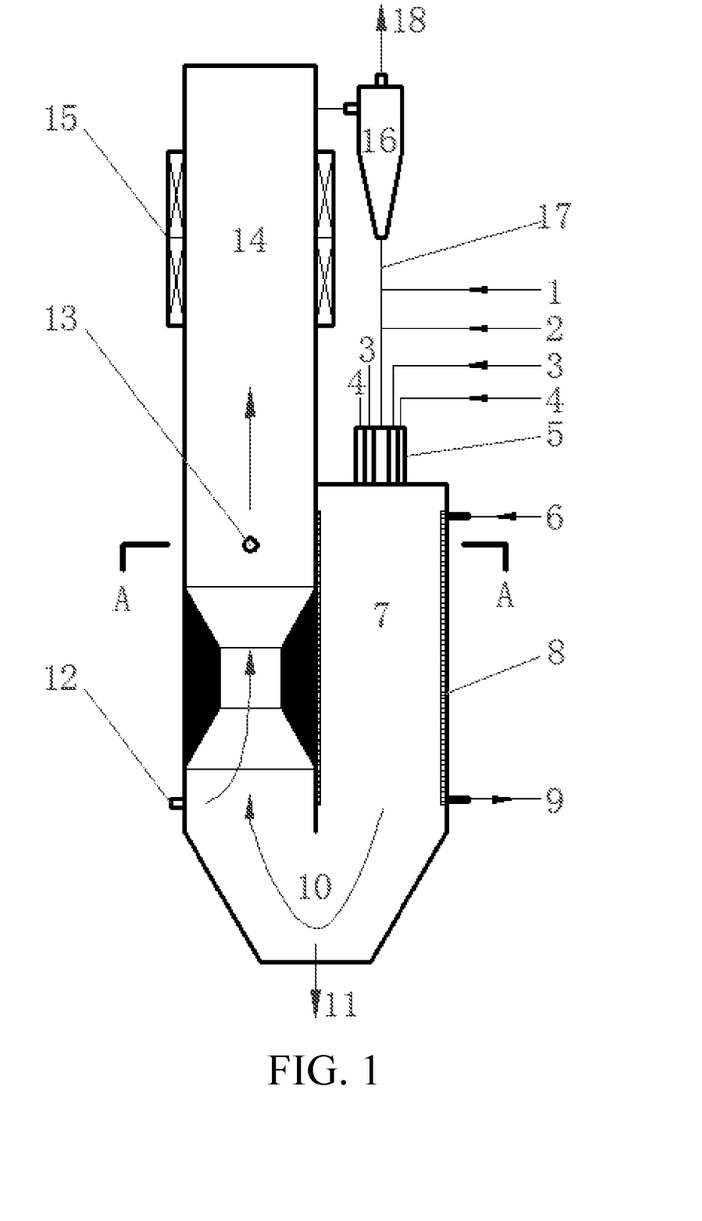
FIG. 1 is a structure schematic diagram of an embodiment I of a pulverized coal gasification device for producing high heating value coal gas with low carbon residue content of the present invention.

FIG. 1 is a structure schematic diagram of an embodiment I of a pulverized coal gasification device for producing high heating value coal gas with low carbon residue content of the present invention.

As shown in FIG. 1, the pulverized coal gasification device for producing the high heating value coal gas with the low carbon residue content of the embodiment includes a U-shaped coal gas generation furnace and a coal gas separating device 16, and the U-shaped coal gas generation furnace consists of two section structures including a high-temperature section 14 and a low-temperature section 7 which are arranged in a U-shaped manner; the high-temperature section 14 and the low-temperature section 7 share an ash hopper 10; the high-temperature section 14 is a downward entrained-flow bed, and the low-temperature section 7 is an upward entrained-flow bed; and an inlet of the coal gas separating device 16 is connected to an outlet of the low-temperature section 7, a solid outlet of the coal gas separating device 16 is connected to an inlet of the high-temperature section 14, and a gas outlet of the coal gas separating device 16 is connected to a coal gas waste heat utilizing and purifying system.

In the embodiment, the coal gas waste heat utilizing and purifying system can also be implemented by an existing structure.

Particularly, pulverized coal 1, coal fly ash 2, oxygen 3 and water vapor 4 as well as semicoke 17 obtained from the coal gas separating device 16 enter the low-temperature section 7 through a gasification nozzle 5 at first, and meanwhile, in a treatment process of the low-temperature section 7, water 6 is further fed correspondingly. After treatment of the low-temperature section 7, water vapor 9 and ash/slag 11 are obtained, and the ash 11 is discharged outwards from the ash hopper 10. Finally, the coal gas 18 is discharged through the gas outlet of the coal gas separating device 16.

In the embodiment, the low-temperature section 7 includes a low-temperature section furnace body, a position where the low-temperature section furnace body is connected to the high-temperature section 14 is a low-temperature section throat, an oxygen\air nozzle 12 is arranged at a lower end of the low-temperature section throat, and low-temperature section pulverized coal nozzles 13 are arranged at an upper end of the low-temperature section throat.

In the embodiment, the low-temperature section furnace body is further provided with a microwave reforming device 15 which is used for implementing recombination of hydrocarbons substances.

Where the microwave reforming device is auxiliary equipment, and can be selectively used as needed, and the specific structure of the microwave reforming device can be implemented by an existing structure.

In specific implementation, the low-temperature section pulverized coal nozzles are of single-channel structures.

Figure 2:
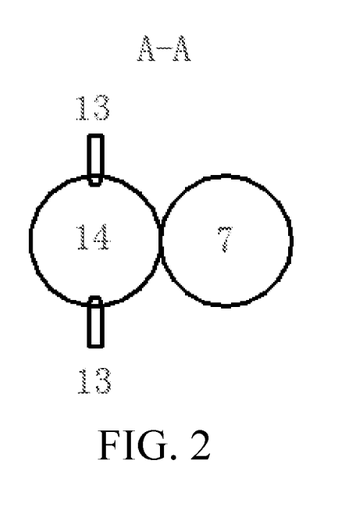
FIG. 2 is an A-A cross section view in the embodiment I of the pulverized coal gasification device for producing the high heating value coal gas with the low carbon residue content of the present invention.

A feeding mode of the low-temperature section pulverized coal nozzles 13 can be any of the following modes:

First mode: the feeding mode of the low-temperature section pulverized coal nozzles 13 is a pneumatic conveying mode, and a conveying medium is nitrogen or hot smoke; and a number of the low-temperature section pulverized coal nozzles 13 is two, and the two low-temperature section pulverized coal nozzles 13 are arranged oppositely, as shown in FIG. 2.

Second mode: the feeding mode of the low-temperature section pulverized coal nozzles 13 is a chute mode.

In specific implementation, the high-temperature section 14 includes a high-temperature section furnace body, a water-cooled wall 8 is arranged on an outer side of the high-temperature section furnace body, and a high-temperature section pulverized coal nozzle is arranged on the top of the high-temperature section furnace body.

In specific implementation, the high-temperature section pulverized coal nozzle is of a three-channel structure, where the three-channel structure includes a central material feeding layer, an outer pure oxygen feeding layer and an outermost water vapor feeding layer.

According to the pulverized coal gasification device for producing the high heating value coal gas with the low carbon residue content of the embodiment, the high heating value coal gas with relatively high content of the hydrocarbons substances can be obtained through gasification of two sections including the high-temperature section and the low-temperature section. The raw materials are subjected to gasification reaction at the high-temperature section to obtain the high-temperature coal gas, after the high-temperature coal gas enters the low-temperature section, newly added pulverized coal is subjected to thermal decomposition reaction with the aid of heat of the high-temperature coal gas, homogeneous gasification reaction and heterogeneous gasification reaction are carried out simultaneously, and finally, the high heating value coal gas with high content of the hydrocarbons substances and the unreacted semicoke are obtained; where the unreacted semicoke is directly fed into the high-temperature section and is gasified at a high temperature.

Carbon residues obtained after coal gasification can be fully utilized in the embodiment, the carbon conversion rate is high. The coal fly ash, which is collected by coal gas dust removal purification device, is directly fed into the high-temperature section and is gasified at a high temperature, the carbon residues are utilized, and thus, the carbon conversion rate is increased.

The microwave reforming device is arranged at the low-temperature section of the embodiment, under the microwave effect, the content of tar can be reduced, and coal gas components are adjusted according to the requirement of a user to obtain synthetic gas.

Embodiment II

Figure 3:
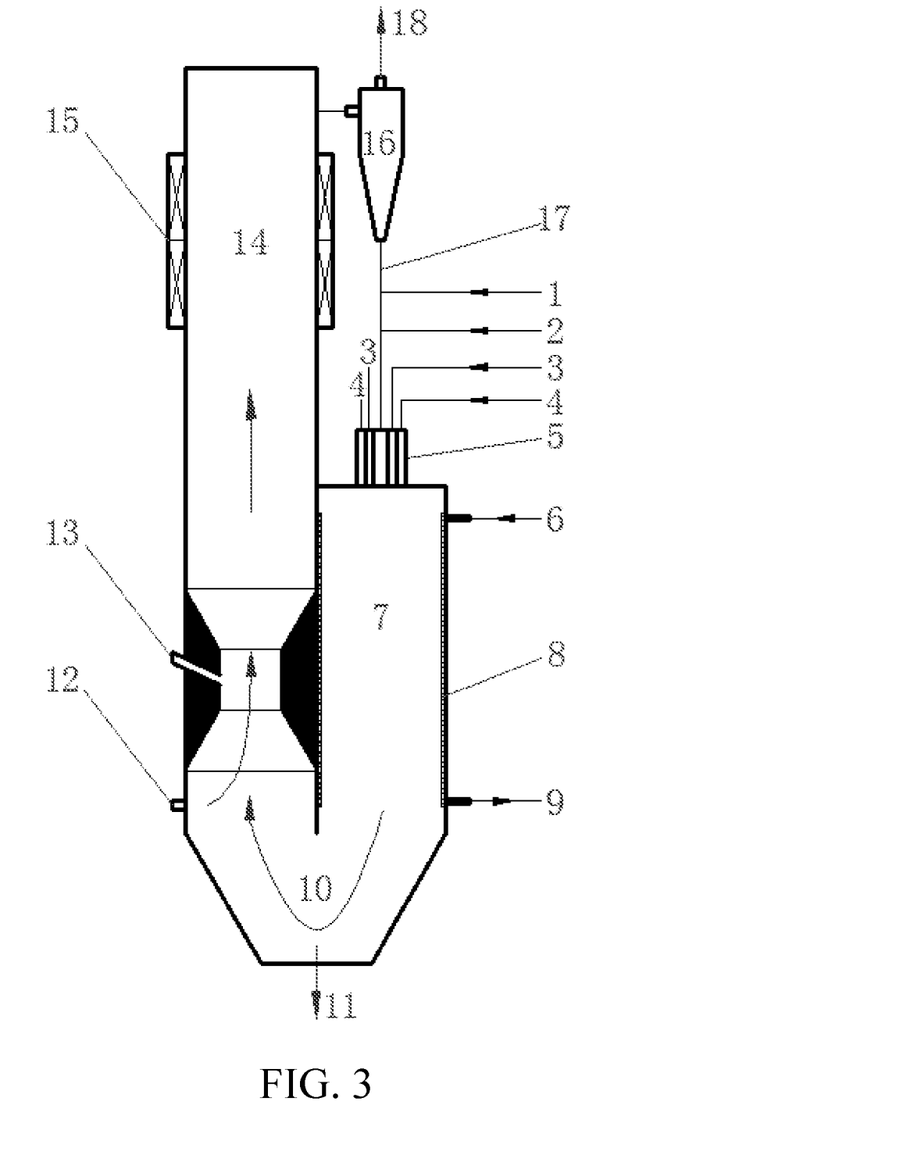
FIG. 3 is a structure schematic diagram of an embodiment II of the pulverized coal gasification device for producing the high heating value coal gas with the low carbon residue content of the present invention.

FIG. 3 is a structure schematic diagram of an embodiment II of the pulverized coal gasification device for producing the high heating value coal gas with the low carbon residue content of the present invention.

As shown in FIG. 3, the pulverized coal gasification device for producing the high heating value coal gas with the low carbon residue content of the embodiment includes a U-shaped coal gas generation furnace and a coal gas separating device 16, and the U-shaped coal gas generation furnace consists of two section structures including a high-temperature section 14 and a low-temperature section 7 which are arranged in a U-shaped manner; the high-temperature section 14 and the low-temperature section 7 share an ash hopper 10; the high-temperature section 14 is a downward entrained-flow bed, and the low-temperature section 7 is an upward entrained-flow bed; and an inlet of the coal gas separating device 16 is connected to an outlet of the low-temperature section 7, a solid outlet of the coal gas separating device 16 is connected to an inlet of the high-temperature section 14, and a gas outlet of the coal gas separating device 16 is connected to a coal gas waste heat utilizing and purifying system.

In the embodiment, the coal gas waste heat utilizing and purifying system can also be implemented by an existing structure.

Particularly, pulverized coal 1, coal fly ash 2, oxygen 3 and water vapor 4 as well as semicoke 17 obtained from the coal gas separating device 16 enter the low-temperature section 7 through a gasification nozzle 5 at first, and meanwhile, in a treatment process of the low-temperature section 7, water 6 is further fed correspondingly. After treatment of the low-temperature section 7, water vapor 9 and ash 11 are obtained, and the ash/slag 11 is discharged outwards from the ash hopper 10. Finally, the coal gas 18 is discharged outwards through the gas outlet of the coal gas separating device 16.

In the embodiment, the low-temperature section 7 includes a low-temperature section furnace body, a position where the low-temperature section furnace body is connected to the high-temperature section 14 is a low-temperature section throat, an oxygen\air nozzle 12 is arranged at a lower end of the low-temperature section throat, and low-temperature section pulverized coal nozzles 13 are arranged at the low-temperature section throat.

In the embodiment, the low-temperature section furnace body is further provided with a microwave reforming device 15 which is used for implementing recombination of hydrocarbons substances.

The microwave reforming device is auxiliary equipment, and can be selectively used as needed, and the specific structure of the microwave reforming device can be implemented by an existing structure.

In specific implementation, the low-temperature section pulverized coal nozzles are of single-channel structures.

A feeding mode of the low-temperature section pulverized coal nozzles 13 can be any of the following modes:

First mode: the feeding mode of the low-temperature section pulverized coal nozzles 13 is a pneumatic conveying mode, and a conveying medium is nitrogen or hot smoke; and a number of the low-temperature section pulverized coal nozzles 13 is two, and the two low-temperature section pulverized coal nozzles 13 are arranged oppositely, as shown in FIG. 2.

Second mode: the feeding mode of the low-temperature section pulverized coal nozzles 13 is a chute mode.

In specific implementation, the high-temperature section 14 includes a high-temperature section furnace body, a water-cooled wall 8 is arranged on an outer side of the high-temperature section furnace body, and a high-temperature section pulverized coal nozzle is arranged on the top of the high-temperature section furnace body.

In specific implementation, the high-temperature section pulverized coal nozzle is of a three-channel structure, where the three-channel structure includes a central material feeding layer, an outer pure oxygen feeding layer and an outermost water vapor feeding layer.

According to the pulverized coal gasification device for producing the high heating value coal gas with the low carbon residue content of the embodiment, the high heating value coal gas with relatively high content of the hydrocarbons substances can be obtained through gasification of two sections including the high-temperature section and the low-temperature section, the raw materials are subjected to gasification reaction at the high-temperature section to obtain the high-temperature coal gas, after the high-temperature coal gas enters the low-temperature section, newly added pulverized coal is subjected to thermal decomposition reaction with the aid of heat of the high-temperature coal gas, homogeneous gasification reaction and heterogeneous gasification reaction are carried out simultaneously, and finally, the high heating value coal gas with high content of the hydrocarbons substances and the unreacted semicoke are obtained; where the unreacted semicoke is directly fed into the high-temperature section and is gasified at a high temperature.

Carbon residues obtained after coal gasification can be fully utilized in the embodiment, the carbon conversion rate is high, the coal fly ash, which is collected by coal gas dust removal purification device, is directly fed into the high-temperature section and is gasified at a high temperature, the carbon residues are utilized, and thus, the carbon conversion rate is increased.

The microwave reforming device is arranged at the low-temperature section of the embodiment, under the microwave effect, the content of tar can be reduced, and coal gas components are adjusted according to the requirement of a user to obtain synthetic gas.

The present invention further provides a pulverized coal gasification process based on the pulverized coal gasification device for producing high heating value coal gas with the low carbon residue content.

Figure 4:
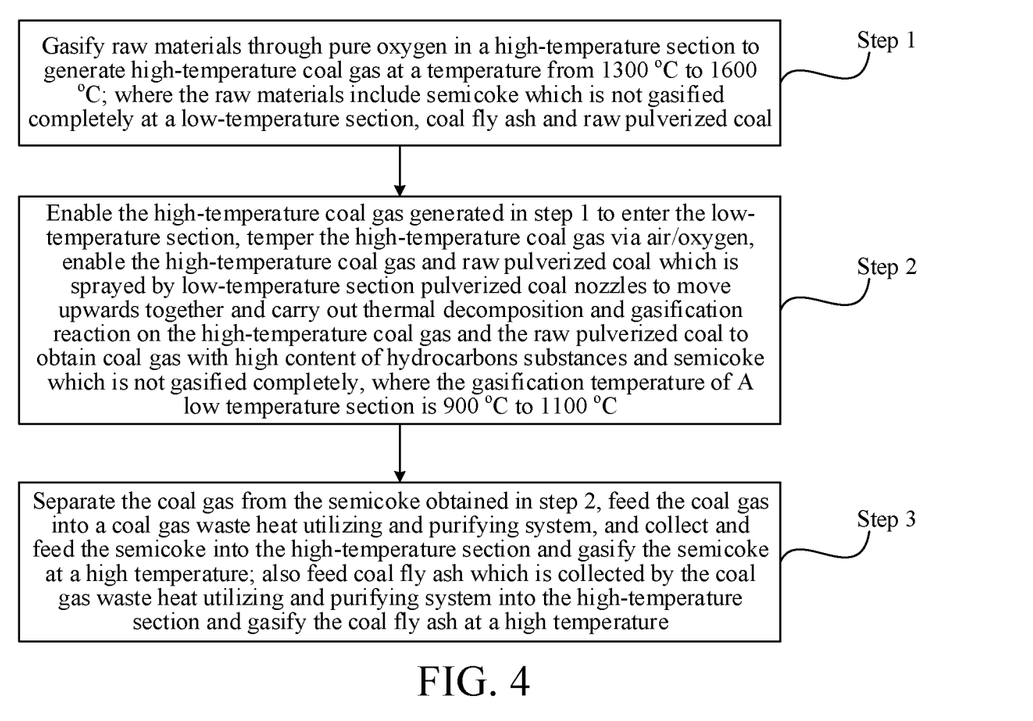
FIG. 4 is a flow chart of a pulverized coal gasification process based on the pulverized coal gasification device for producing the high heating value coal gas with the low carbon residue content of the present invention.

FIG. 4 a flow chart of the pulverized coal gasification process based on the pulverized coal gasification device for producing high heating value coal gas with the low carbon residue content.

As shown in FIG. 4, the pulverized coal gasification process based on the pulverized coal gasification device for producing high heating value coal gas with the low carbon residue content of the present invention includes:

step 1: raw materials are gasified through pure oxygen in the high-temperature section to generate high-temperature coal gas, and a temperature is from 1300° C. and 1600° C.; where the raw materials include semicoke which is not gasified completely at the low-temperature section, coal fly ash and raw pulverized coal;

step 2: the high-temperature coal gas generated in step 1 enters the low-temperature section, and is tempered via air/oxygen, the high-temperature coal gas and the raw pulverized coal sprayed by the low-temperature sectional pulverized coal nozzles move upwards together and are subjected to thermal decomposition and gasification reaction to obtain coal gas with high content of hydrocarbons substances and semicoke which is not gasified completely, and the temperature of low temperature section is 900° C. to 1100° C.; and step 3: the coal gas and the semicoke which are obtained in step 2 are separated, the coal gas is fed into the coal gas waste heat utilizing and purifying system, and the semicoke is collected and fed into the high-temperature section and then is gasified at a high temperature; and the fly ash which is collected by the coal gas waste heat utilizing and purifying system is also fed into the high-temperature section and is gasified at a high temperature.

In specific implementation, the microwave reforming device on the upper portion of the low-temperature section can split and decompose tar in the coal gas and reform the coal gas into synthetic gas, under the microwave effect, the content of tar of the coal gas can be reduced, and the coal gas components are adjusted according to the requirement of the user to obtain the synthetic gas.

Although the specific embodiments of the present invention have been described in connection with the accompanying drawings, it is not intended to limit the scope of the protection of the present invention, and it will be apparent to those skilled in the art that based on the technical solution of the present invention, various modifications or alternatives got by those skilled in the art on the premise of not paying creative labor, are still in the scope of the protection of the present invention.

What is claimed is:

1. A pulverized coal gasification device for producing high heating value coal gas with low carbon residue content, wherein, comprising a U-shaped coal gas generation furnace and a coal gas-semicoke separating device, wherein the U-shaped coal gas generation furnace comprises two section structures namely a high-temperature section and a low-temperature section which are arranged in a U-shaped manner; the high-temperature section and the low-temperature section share an ash hopper; the high-temperature section is a downward entrained-flow bed, and the low-temperature section is an upward entrained-flow bed; and an inlet of the coal gas-semicoke separating device is connected to an outlet of the low-temperature section, a solid outlet of the coal gas separating device is connected to an inlet of the high-temperature section, and a gas outlet of the coal gas separating device is connected to a coal gas waste heat utilizing and purifying system;

wherein the low-temperature section comprises a low-temperature section furnace body, a position where the low-temperature section furnace body is connected to the high-temperature section is a low-temperature section throat, an oxygen\air nozzle is arranged at a lower end of the low-temperature section throat, and low-temperature section pulverized coal nozzles are arranged at an upper end of the low-temperature section throat.

2. The pulverized coal gasification device for producing the high heating value coal gas with the low carbon residue content according to claim 1, wherein the low-temperature section furnace body is further provided with a microwave reforming device.

3. The pulverized coal gasification device for producing the high heating value coal gas with the low carbon residue content according to claim 1, wherein the low-temperature section pulverized coal nozzles are of single-channel structures.

4. The pulverized coal gasification device for producing the high heating value coal gas with the low carbon residue content according to claim 1, wherein a feeding mode of the low-temperature section pulverized coal nozzles is a pneumatic conveying mode, and a conveying medium is nitrogen or hot smoke; and a number of the low-temperature section pulverized coal nozzles is two, and the two low-temperature section pulverized coal nozzles are arranged oppositely.

5. The pulverized coal gasification device for producing the high heating value coal gas with the low carbon residue content according to claim 1, wherein a feeding mode of the low-temperature section pulverized coal nozzles is a chute mode.

6. The pulverized coal gasification device for producing the high heating value coal gas with the low carbon residue content according to claim 1, wherein the high-temperature section comprises a high-temperature section furnace body, a water-cooled wall is arranged on an outer side of the high-temperature section furnace body, and a high-temperature section pulverized coal nozzle is arranged on the top of the high-temperature section furnace body.

7. The pulverized coal gasification device for producing the high heating value coal gas with the low carbon residue content according to claim 6, wherein the high-temperature section pulverized coal nozzle has a three-channel structure, and the three-channel structure comprises a central material feeding layer, an outer pure oxygen feeding layer, and an outermost water vapor feeding layer.

8. A pulverized coal gasification process based on the pulverized coal gasification device for producing high heating value coal gas with the low carbon residue content of claim 1, comprising:

step 1: gasifying raw materials through pure oxygen in a high-temperature section to generate high-temperature coal gas at a temperature from 1300° C. to 1600° C.; wherein the raw materials comprise semicoke which is not gasified completely at the low-temperature section, coal fly ash and raw pulverized coal;

step 2: enabling the high-temperature coal gas generated in step 1 to enter the low-temperature section, tempering the high-temperature coal gas via air/oxygen, enabling the high-temperature coal gas and the raw pulverized coal which is sprayed by the low-temperature section pulverized coal nozzles to move upwards together and carrying out thermal decomposition and gasification reaction on the high-temperature coal gas and the raw pulverized coal to obtain coal gas with high content of hydrocarbons substances and semicoke which is not gasified completely, wherein a gasification temperature of a low temperature section is 900° C. to 1100° C.; and     step 3, separating the coal gas from the semicoke obtained in step 2, feeding the coal gas into a coal gas waste heat utilizing and purifying system, and collecting and feeding the semicoke into the high-temperature section and gasifying the semicoke at a high temperature; and also feeding coal fly ash which is collected by the coal gas waste heat utilizing and purifying system into the high-temperature section and gasifying the coal fly ash at a high temperature.

\* \* \* \* \*